US010012765B2

(12) United States Patent
Haas et al.

(10) Patent No.: US 10,012,765 B2
(45) Date of Patent: Jul. 3, 2018

(54) GEOGRAPHICAL CONDITION PREDICTION

(71) Applicant: INTERNATIONAL BUSINESS MACHINES CORPORATION, Armonk, NY (US)

(72) Inventors: Richard M. Haas, Wellesley, MA (US); Randy S. Johnson, O'Fallon, MO (US); Tedrick N. Northway, Wood River, IL (US); H. William Rinckel, Prospect, CT (US)

(73) Assignee: International Business Machines Corporation, Armonk, NY (US)

( * ) Notice: Subject to any disclaimer, the term of this patent is extended or adjusted under 35 U.S.C. 154(b) by 655 days.

(21) Appl. No.: 14/620,353

(22) Filed: Feb. 12, 2015

(65) Prior Publication Data

US 2016/0239750 A1 Aug. 18, 2016

(51) Int. Cl.
*G06Q 50/16* (2012.01)
*G01W 1/10* (2006.01)

(52) U.S. Cl.
CPC .............. *G01W 1/10* (2013.01); *G06Q 50/16* (2013.01); *Y02A 90/14* (2018.01)

(58) Field of Classification Search
USPC .......................................................... 705/2, 3
See application file for complete search history.

(56) References Cited

U.S. PATENT DOCUMENTS 7,920,626 B2 4/2011 Fernandez et al.
8,493,442 B2 7/2013 Fernandez et al.
8,634,015 B2 1/2014 Kimura
2004/0153330 A1* 8/2004 Miller .................. G06Q 40/025 705/38
2013/0163823 A1 6/2013 Chigos et al.
2014/0012720 A1* 1/2014 O'Kane ................. G06Q 40/02 705/35

OTHER PUBLICATIONS

Hwang, J. and R. J. Sampson. 2014. "Divergent Pathways of Gentrification: Racial Inequality and the Social Order of Renewal in Chicago Neighborhoods." American Sociological Review 79 (4) (Jun. 12, 2014): 726-751. doi:10.1177/0003122414535774.*
Shirai, Yoshiaki; Image Processing for Data Capture; IP.com; IP.com No. 000131549; Nov. 11, 2005; 16 pages.
Herberg et al.; Definition of Management Objects for the Neighborhood Discovery Protocol (RFC 6779); IP.com; IP. com No. 000223073; Nov. 1, 2012; 135 pages.

* cited by examiner

*Primary Examiner* — Elaine Gort
*Assistant Examiner* — Devin C Hein
(74) *Attorney, Agent, or Firm* — Schmeiser, Olsen & Watts; John R. Pivnichny

(57) ABSTRACT

A method and system for forecasting the conditions of locations is provided. The method includes receiving in real time from a user in a specified location, a specified future timeframe associated with a future condition of the specified location. Multiple condition data sets associated with an element of the specified location are simultaneously retrieved and a best fit polynomial equation associated with predicting a future condition of the element is selected. Condition score values associated with future conditions of the element are calculated. An overall condition score value associated with an aggregation of individual condition score values is calculated and presented.

20 Claims, 7 Drawing Sheets

100
5a
5b
5c
5n
NETWORK
IMAGE DATA SYSTEMS
7
14
29
MEMORY SYSTEM
8a
SOFTWARE
17
8

GEOGRAPHICAL CONDITION PREDICTION

FIELD

The present invention relates generally to a method for predicting conditions of a geographical area and in particular to a method and associated system for predicting geographical area conditions based on images and a simulation process.

BACKGROUND

Determining neighborhood conditions at a future point in time typically includes a subjective process that may be reliant on: an individual's perception of a current condition of a neighborhood; a potential consideration with respect to past changes to a neighborhood; and beliefs with respect to a future evolution of a neighborhood.

Individuals typically rely on multiple visits to a specific neighborhood in order to formulate an opinion as to the suitability of: an area for investment (e.g., by a municipality, an individual, etc.), home ownership, travel, etc. Typical street view mapping products enable individuals to virtually visit neighborhoods by allowing a scrolling process with respect to street-level images stored in a database.

Additionally, typical image capturing apparatuses may provide a correlation between images. Likewise, typical image capture and recognition systems include communications with a database of predetermined identification values.

Accordingly, there exists a need in the art to overcome at least some of the deficiencies and limitations described herein above.

SUMMARY

A first aspect of the invention provides a location condition forecasting method comprising: receiving in real time from a user in a specified location, by a computer processor of a computing system, a specified future timeframe associated with a future condition of said specified location; simultaneously retrieving, by said computer processor from a database, multiple condition data sets associated with at least one element of said specified location; selecting, by said computer processor, a best fit polynomial equation associated with predicting a future condition of said at least one element; simultaneously calculating, by said computer processor executing said best fit polynomial equation with respect to said multiple condition data sets and said specified future timeframe, condition score values associated with future conditions of said at least one element; calculating, by said computer processor, an overall condition score value associated with said condition score values, wherein said overall condition score value comprises an aggregated weighted average of said condition score values; and presenting, by said computer processor to a user, said overall condition score value.

A second aspect of the invention provides computing system comprising a computer processor coupled to a computer-readable memory unit, said memory unit comprising instructions that when executed by the computer processor implements a method comprising: receiving in real time from a user in a specified location, by said computer processor, a specified future timeframe associated with a future condition of said specified location; simultaneously retrieving, by said computer processor from a database, multiple condition data sets associated with at least one element of said specified location; selecting, by said computer processor, a best fit polynomial equation associated with predicting a future condition of said at least one element; simultaneously calculating, by said computer processor executing said best fit polynomial equation with respect to said multiple condition data sets and said specified future timeframe, condition score values associated with future conditions of said at least one element; calculating, by said computer processor, an overall condition score value associated with said condition score values, wherein said overall condition score value comprises an aggregated weighted average of said condition score values; and presenting, by said computer processor to a user, said overall condition score value.

A third aspect of the invention provides computer program product, comprising a computer readable hardware storage device storing a computer readable program code, said computer readable program code comprising an algorithm that when executed by a computer processor of a computing system implements a method, said method comprising: receiving in real time from a user in a specified location, by said computer processor, a specified future timeframe associated with a future condition of said specified location; simultaneously retrieving, by said computer processor from a database, multiple condition data sets associated with at least one element of said specified location; selecting, by said computer processor, a best fit polynomial equation associated with predicting a future condition of said at least one element; simultaneously calculating, by said computer processor executing said best fit polynomial equation with respect to said multiple condition data sets and said specified future timeframe, condition score values associated with future conditions of said at least one element; calculating, by said computer processor, an overall condition score value associated with said condition score values, wherein said overall condition score value comprises an aggregated weighted average of said condition score values; and presenting, by said computer processor to a user, said overall condition score value.

The present invention advantageously provides a simple method and associated system capable of determining location conditions.

BRIEF DESCRIPTION OF THE DRAWINGS

FIG. 3, including

DETAILED DESCRIPTION

Figure 1:
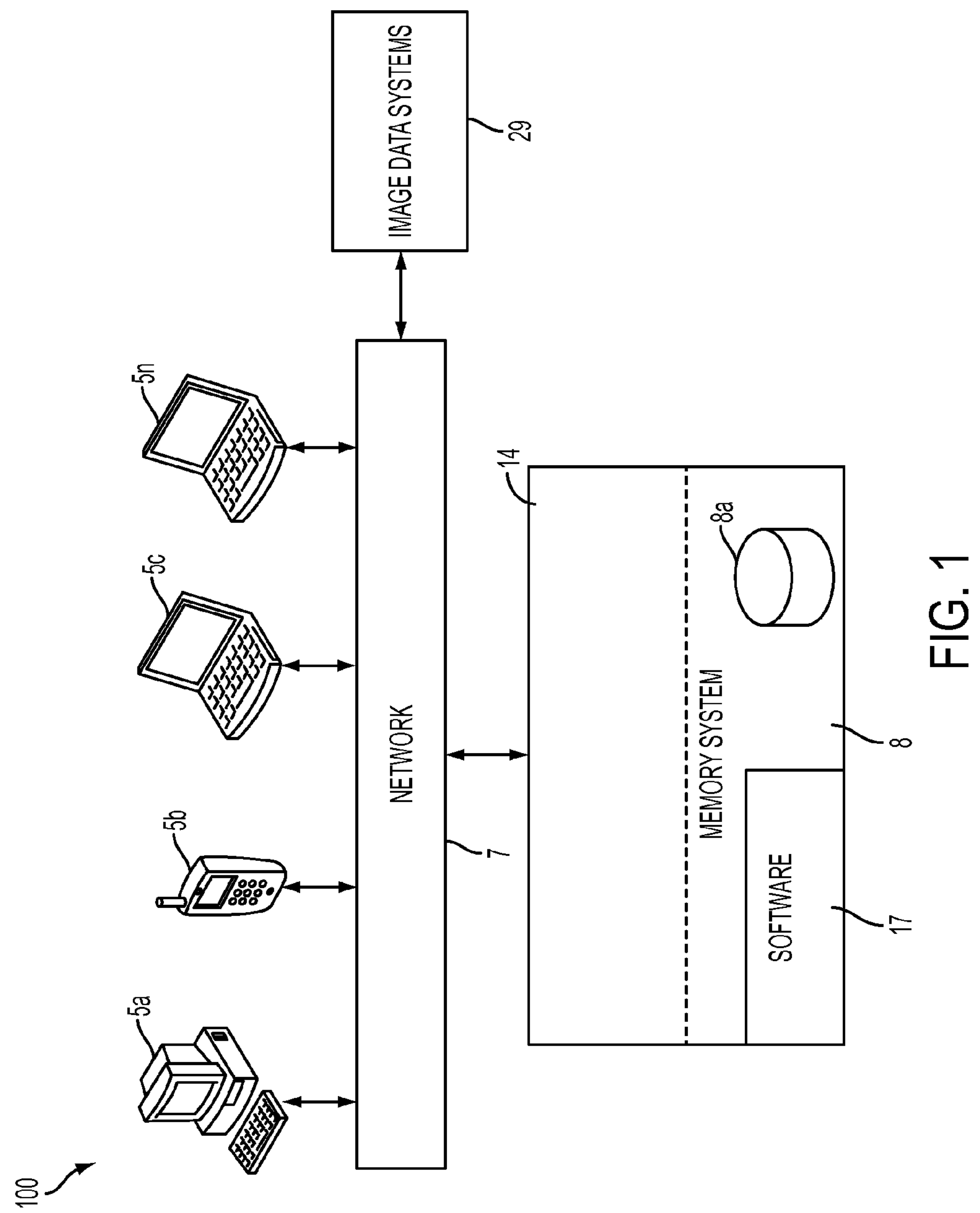
FIG. 1 illustrates a system for enabling a process for predicting a future overall condition of a geographical area, in accordance with embodiments of the present invention.

FIG. 1 illustrates a system 100 for enabling a process for predicting a future overall condition of a geographical area, in accordance with embodiments of the present invention. Various mapping products produce results for allowing individuals to virtually visit neighborhoods with respect to street-level images stored in a database. The aforementioned mapping products may not provide timely and automated condition data over time. Additionally, the aforementioned mapping products do not project a future condition of a location. Consequently, individuals may determine or project a future condition of a specific geographic location by physically visiting the specific geographic location. Additionally, aggregating data of interest (i.e., retrieved from the aforementioned mapping products) in a timely and automated manner often remains difficult with slow dissemination of information. Therefore, system 100 accurately identifies and presents a condition or health of specific geographical locations via analysis of image data. This disclosure provides a method that solves this problem by forecasting neighborhood conditions through a scenario-based approach that utilizes image data to construct both a historical record and identify real-time conditions associated with a neighborhood, with an algorithm applied to project future conditions.

System 100 utilizes image data (e.g., from traffic cameras, CCTV, personal cameras, etc.) as input to an algorithm executed for objectively determining differing conditions of specific geographical locations during various time periods. Data associated with the differing conditions are used to extrapolate future conditions associated with the geographical locations. The image data comprises unstructured data enabling system 100 to perform an analysis for retrieving relevant elements. An element is defined herein as a representing of a discrete, physical object that includes well-defined characteristics. For example, a window is an element within an image of a house. System 100 assesses all elements in an image to form an overall score for house. All calculated house scores may be aggregated to form a neighborhood score. Elements comprise base constituents for any calculation and therefore element scores may be used to calculate aggregated neighborhood scores. For example, all element scores (e.g., for all windows, doors, trees, lawns, streets, railings, etc.) for a neighborhood may be directly aggregated.

The elements are assessed against a database of previous elements comprising known conditions. The assessment process may result in information for identifying various conditions of differing elements including, inter alia, a village green, residential landscaping, debris left in roadways, a condition of residential homes (e.g., in need of paint, damaged shingles, etc.), etc. A located match between an image and database elements (i.e., located during the assessment process) allows system 100 to extract an associated condition score. All condition scores retrieved from previous matches are stored in a database and a current image is analyzed in real-time. Based on a historical record, system 100 extrapolates a rate of change with respect to conditions of elements. The rate of change is applied to current conditions in order to determine a baseline scenario associated with element conditions in the future. Additionally, system 100 allows a user to simulate various changes to specific elements in the future (e.g., a construction project to improve road surface, etc.). The simulated changes may be incorporated into the projection.

System 100 performs a process that includes:

1. Receiving a real time video feed (e.g., a video stream, still video images, etc.) from a plurality of cameras located in a geographical area (e.g., a neighborhood).
2. Pre-specifying a geographical area condition (e.g., health) measure.
3. Processing the real time video feed by comparing the real time video feed to stored video images corresponding to a specified measure.
4. Calculating a numerical value for the specified measure based on the comparison.
5. Extrapolate a rate of change with respect to conditions of elements of the geographical area. The rate of change is applied to current conditions in order to determine a baseline scenario associated with element conditions in the future.

System 100 of FIG. 1 includes devices **5*a* . . . 5*n* and image data systems 29 connected through a network 7 to a computing system 14. Network 7 may include any type of network including, inter alia, a local area network, (LAN), a wide area network (WAN), the Internet, a wireless network, etc. Devices 5*a* . . . 5*n* may include any type of computing devices or software systems including, inter alia, a computer (PC), a laptop computer, a tablet computer, a server, a PDA, a smart phone, a secure Website, an application, etc. Image data systems 29 may include any type of image data retrieval systems for retrieving image data (e.g., a video stream, still video images, etc.) from, inter alia, cameras (e.g., traffic cameras, security cameras, personal cameras, etc.), social networking Websites, etc. Computing system 14 may include any type of computing system(s) including, inter alia, a computer (PC), a laptop computer, a tablet computer, a server, etc. Computing system 14 includes a memory system 8. Memory system 8 may include a single memory system. Alternatively, memory system 8 may include a plurality of memory systems. Memory system 8 includes a database 8*a* and software 17**.

Software 17 enables a process for identifying current and future conditions or health of specific locations (e.g., a specified geographical are such as a neighborhood) through analysis of image data retrieved from image data systems 29. System 100 utilizes the image data to objectively determine a condition or health of a specified geographical area vs. physically or virtually visiting the specified geographical area. Image data systems 29 generate unstructured data that is filtered and analyzed for relevant elements. The unstructured data (e.g., comprising elements of the geographical area) is extrapolated to determine a condition for the specified geographical area. The unstructured data may identify, inter alia, a condition of a village green, a condition of residential landscaping, debris left in roadways, a condition of residential houses (e.g., paint damage, damaged shingles, etc.), etc. Additionally, historical health condition data (for the geographical area) are retained (e.g., in memory system 8 and/or data image systems 29) to determine whether the geographical area has improved its condition or has deteriorated. System 100 generates personalized assessments of geographical area conditions associated with potential activities including, inter alia, travel, home purchasing, etc. Additionally, system 100 generates (based on analysis of the unstructured data) a score based on user-defined parameters for each location (in the specified geographical area). The generated scores may be plotted on a scalable map, table, or chart for reference. A rate of change with respect to conditions of the elements of the geographical area may be determined and applied to current conditions in order to determine a baseline scenario associated with element conditions in the future.

System 100 enables a process for determining an overall condition of a geographical area as follows:

1. Capturing image data associated with a known location (a geographical area). The images may be captured from, inter alia, traffic cameras, security cameras, personal cameras, etc. The images may be stored in a database (e.g., within image data systems and/or memory system 8).
2. Analyzing contents within an image for discrete elements aligned to categories representative of various environmental conditions. For example, system 100 may examine each retrieved image for elements (such as, inter alia, streets, buildings, automobiles, plants, etc.) and identify an associated condition (e.g., litter in the street, broken windows in buildings, etc.).
3. Scoring each element relative to an identified "best" and "worst" case state. For example, an image illustrating a street in perfect condition with no garbage in the street may be assigned a score of "1" (i.e., a best state). Likewise, an image illustrating a street with a few potholes and some garbage in the gutters may be assigned a score a "4" (i.e., below average). Additionally, a single image may comprise multiple elements each comprising associated scores.
4. Selecting elements relevant to users. A user may select elements relevant to a subjective view of neighborhood conditions. For example, a user may define neighborhood conditions by a condition of buildings and cars with respect to street conditions, tree conditions, etc.
5. Calculating a personalized neighborhood condition score. System 100 calculates a score for each location associated with retrieved image data based on elements and weightings selected by the user.

System 100 may consume different types of input images such as, inter alia:

1. Individual images.
2. A video stream without audio.
3. A video stream that includes audio.
4. A video stream incorporating information from sensors such as, inter alia, a device responding to physical stimulus such as heat, light, sound, pressure, magnetism, and/or a particular motion.

System 100 enables a process for analyzing images of specific locations to determine conditions at a pre-defined frequency (e.g., every 24 hours, every 7 days, etc.). The calculated condition scores are stored in a database (e.g., database 8*a*) with an algorithm applied across a historical record for an individual location to identify a rate of change in conditions. Using this rate, system 100 determines conditions of a location at any point in the future. A user may adjust a rate of change to create different scenarios associated with reflecting a potential for improvement and/or investment in a location. System 100 may display future conditions on a map and allows the user to toggle between different scenarios (e.g., base case given historical record, upside scenario given neighborhood investment, etc.). The conditions of a location at any point in the future may be evaluated by individuals planning projects in the future. For example, a municipal planner seeking to optimize investment of public funds and better understand the impact of civil projects; a real estate investor/homebuyer attempting to discern the future of a neighborhood; a county tax collector adjusting assessed home prices, etc.

System 100 enables a process for predicting a future overall condition of a geographical area as follows:

1. A future timeframe for determining a future neighborhood condition is inputted into system 100.
2. A current neighborhood condition (or multiple element scores as determined, supra) and the future timeframe are inputted into a $3^{rd}$ order polynomial equation to determine predicted future element scores.
4. The predicted future element scores are aggregated to generate a future neighborhood condition score.

The following description illustrates an implementation example executed by system 100 for enabling a process for predicting a future overall condition of a geographical area. The data (i.e., list) below illustrates element and/or property scores of elements and/or properties (and associated dates) of a specified neighborhood (i.e., a geographical location).

1. Jan. 1, 2011: score=5
2. Jul. 1, 2011: score=7
3. Jan. 1, 2012: score=8
4. Jul. 1, 2012: score=9
5. Jan. 1, 2013: score=10
6. Jul. 1, 2013: score=10
7. Jan. 1, 2014: score=9
8. Jul. 1, 2014: score=9
7. Jan. 1, 2015: score=7

In response to receiving the aforementioned data, a 3rd order polynomial is fit to this data with the following parameters: c=0, $a_0$=5, $a_1$=2, $a_2$=−0.4, $a_3$=0.2. All higher order "a" variables (e.g., $a_4$, $a_5$, $a_6$, etc.)=0. Therefore, a predicted condition on Jan. 1, 2016 is calculated to comprise an estimated condition score of 5.

Figure 2:
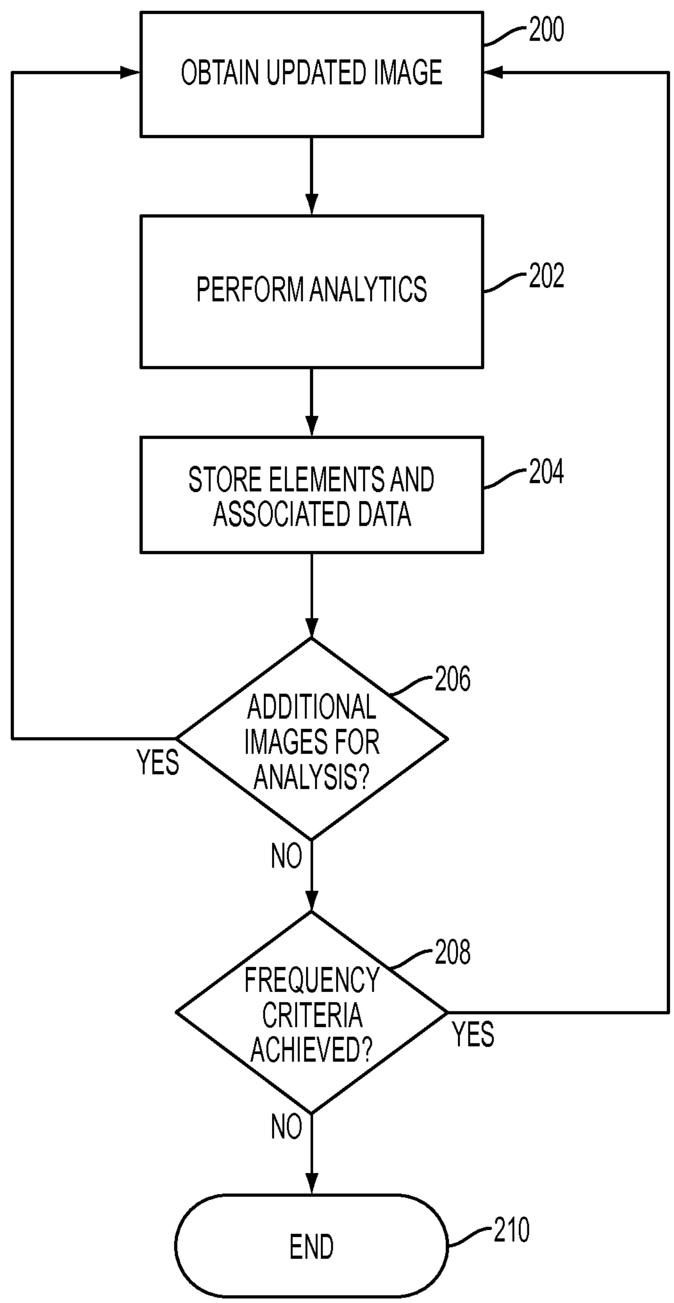
FIG. 2 illustrates an algorithm detailing a process flow enabled by system of FIG. 1 for monitoring a health of a geographical location, in accordance with embodiments of the present invention.

FIG. 2 illustrates an algorithm detailing a process flow enabled by system 100 of FIG. 1 for monitoring a health of a geographical location, in accordance with embodiments of the present invention. Each of the steps in the algorithm of FIG. 2 may be enabled and executed in any order by a computer processor executing computer code. In step 200, an image associated with a specific location at a specific time is obtained (e.g., from a camera). In step 202, the image is analyzed and a condition of elements in the image are assessed (e.g., a condition of the street, a condition of houses, etc.). Step 202 may be executed by disaggregating an image into discrete elements, aligning the discrete elements to categories representative of various environmental conditions, and assigning a score to the condition. In step 204, the discrete elements and the environmental conditions (i.e., associated with the geographical location, a specified time, and a date) are stored in a database. In step 206, it is determined if additional images are available for analysis. If in step 206, it is determined that additional images are available for analysis then step 200 is repeated. If in step 206, it is determined that additional images are not available for analysis then in step 208, a check against a frequency criteria to obtain and analyze new images is executed and if the frequency criteria has been achieved then then step 200 is repeated, else the process is terminated in step 210.

The algorithm of FIG. 2 may be implemented with respect to the following example. System 100 (of FIG. 1) obtains images from traffic cameras at three differing locations. Steps 200-206 are executed to capture and analyze the images and associated elements for three differing locations. Step 208 is executed to control the timing of a next analysis of images from the three differing locations (e.g., if a frequency criteria is set to a weekly analysis, the algorithm will collect and analyze images from the three differing locations once per week).

Figure 3A:
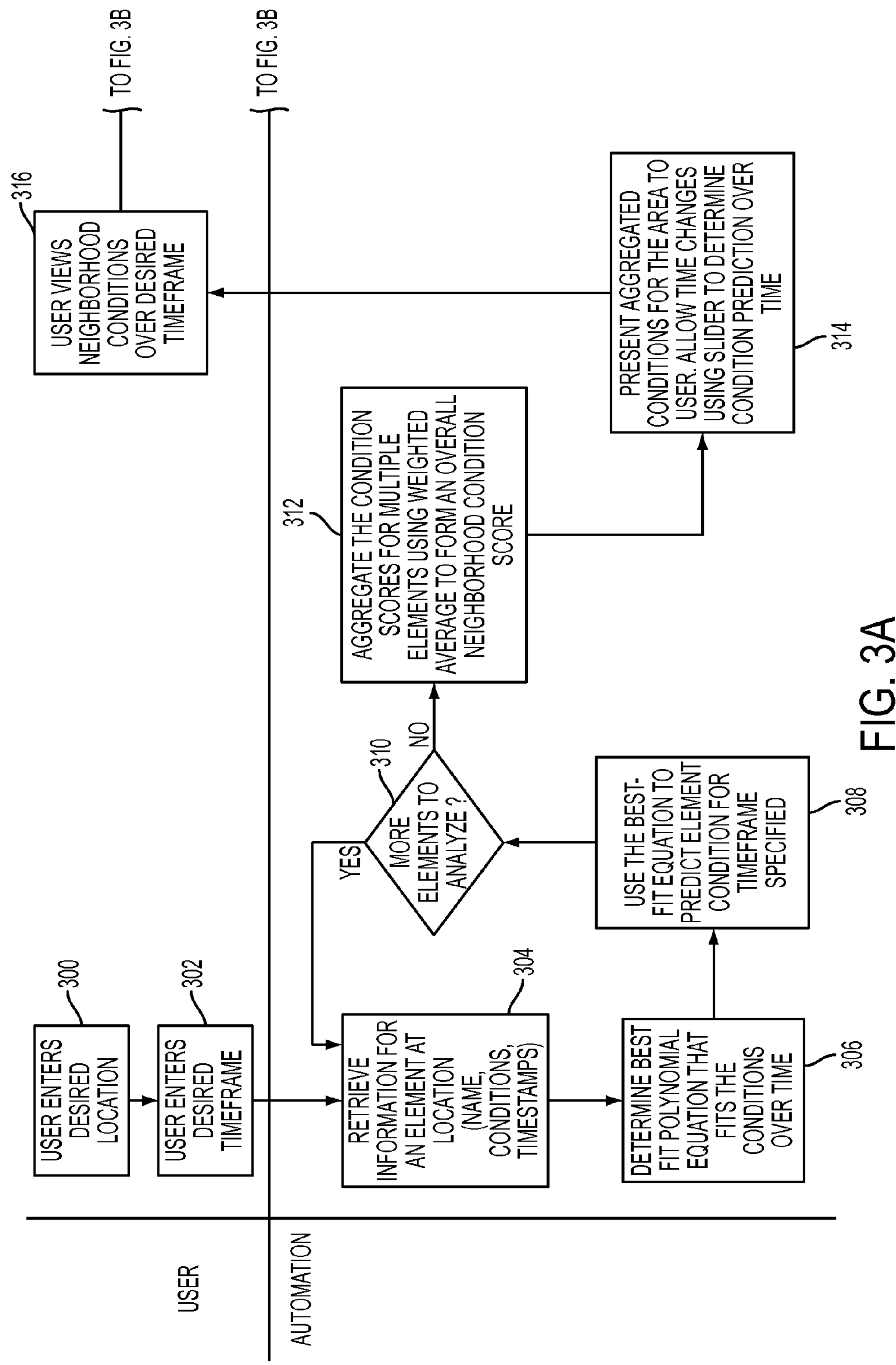
FIGS. 3A and 3B, illustrates an algorithm detailing a process flow enabled by the system of FIG. 1 for predicting a future overall condition of a geographical area, in accordance with embodiments of the present invention.
Figure 3B:
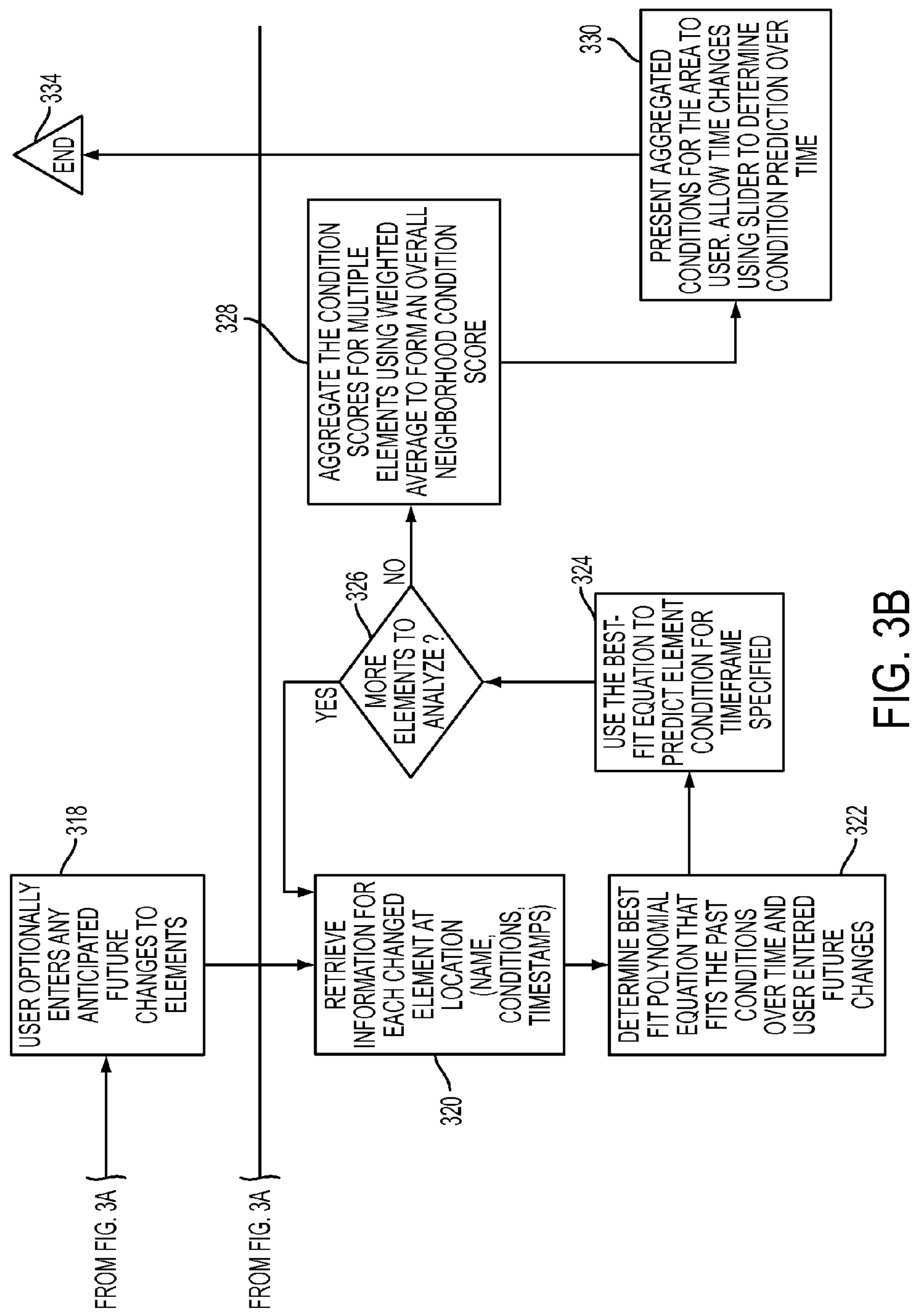

FIG. 3, including FIGS. 3A and 3B, illustrates an algorithm detailing a process flow enabled by system 100 of FIG. 1 for predicting a future overall condition of a geographical area, in accordance with embodiments of the present invention. Each of the steps in the algorithm of FIG. 3 may be enabled and executed in any order by a computer processor executing computer code. In step 300, a user is detected entering a specified geographical location. In step 302, a specified future timeframe associated with a future condition of the specified geographical location (e.g., one year) is entered (i.e., into a computing system such as computing system 14 of FIG. 1). In step 304, historical condition data (i.e., including data describing an element, an associated condition score, and timestamp) associated with the specified geographical location is retrieved from a database. In step 306, a polynomial equation is executed to determine a functional representation that best fits the historical condition data. For example, the following generalized power series may be executed:

$$f(t)=a_0+a_1(t-c)+a_2(t-c)2+a_3(t-c)3+ \ldots$$

With respect to the aforementioned generalized power series: f(t) represents a condition score at a time t, a (including subscripts) represent coefficients, and c represents a constant. The variables a (including subscripts) and constant c are located through a best fit to the historical condition data and determined through a standard technique such as, inter alia, least squares, chi squared approach, etc. In step 308, a condition score for a given element at a time in the future using the ‘best-fit’ equation (including coefficients determined in step 306) is determined. If additional elements are to be analyzed, then step 304 is repeated. If no more additional elements are to be analyzed then step in 312, the condition scores for multiple elements at the specified geographical location are aggregated to form an overall neighborhood (geographical area) condition score using a weighted average. In step 314, the aggregated condition scores are presented to the user for presentation of a condition prediction over time. In step 316, the user views presented conditions over a specified timeframe. In step 318, anticipated future changes to the conditions and/or elements are entered into the system. In step 320, information associated with each changed element is retrieved. In step 322, a best-fit equation for a particular element is adjusted to account for improvements. For example, if the user is a city planner and they intend to repair a road at a specific location, the condition score associated with the road will be adjusted to reflect the improvements specified at a time in the future. In step 324, a condition score for a given element at a time in the future is determined using the ‘best-fit’ equation and user identified improvements. If additional elements are available for analysis in step 326 then step 320 is repeated. If additional elements are not available for analysis in step 326 then in step 328, condition scores for multiple elements at a specific location are aggregated to form an overall neighborhood condition score using a weighted average. In step 330, the aggregated conditions are presented to the user and the process is terminated in step 334.

Figure 4A:
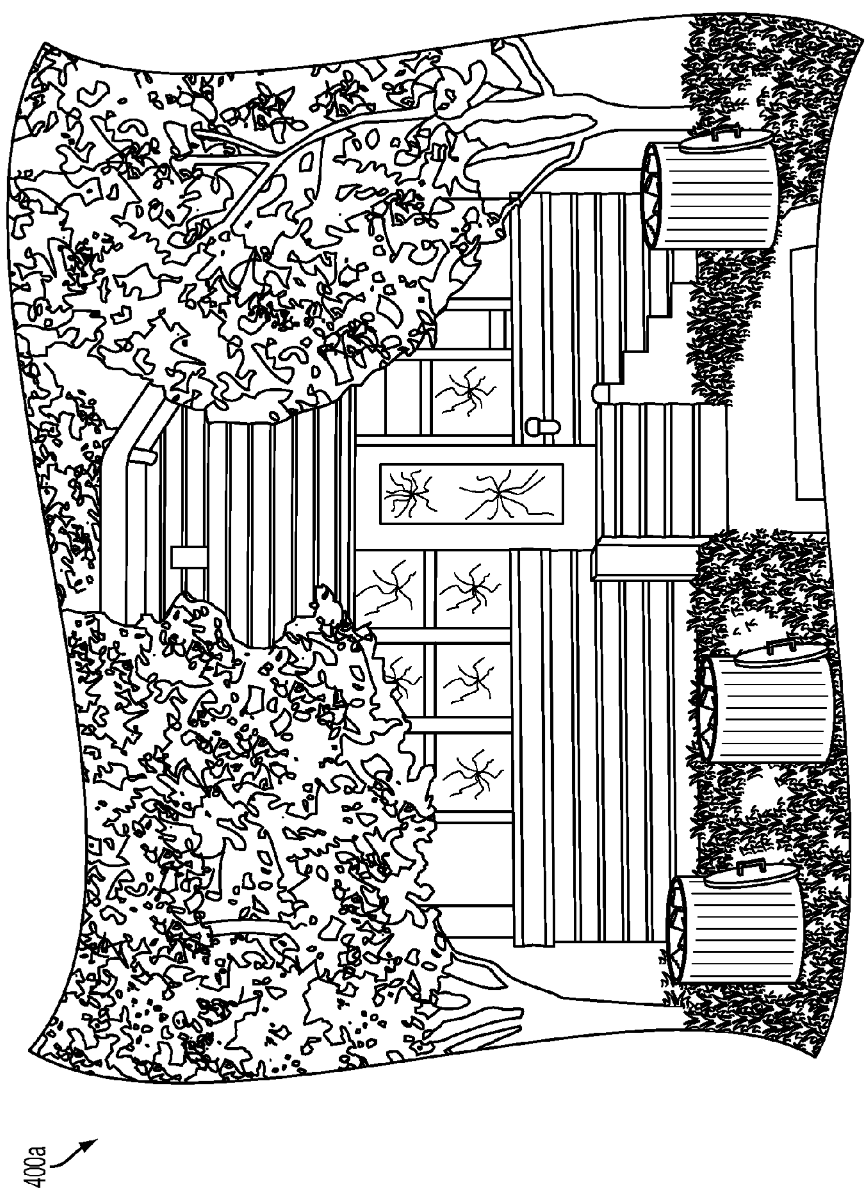
FIGS. 4A-4B, in combination, illustrates an implementation example executed by the system of FIG. 1 for enabling a process for capturing an image at two different points in time, in accordance with embodiments of the present invention.
Figure 4B:
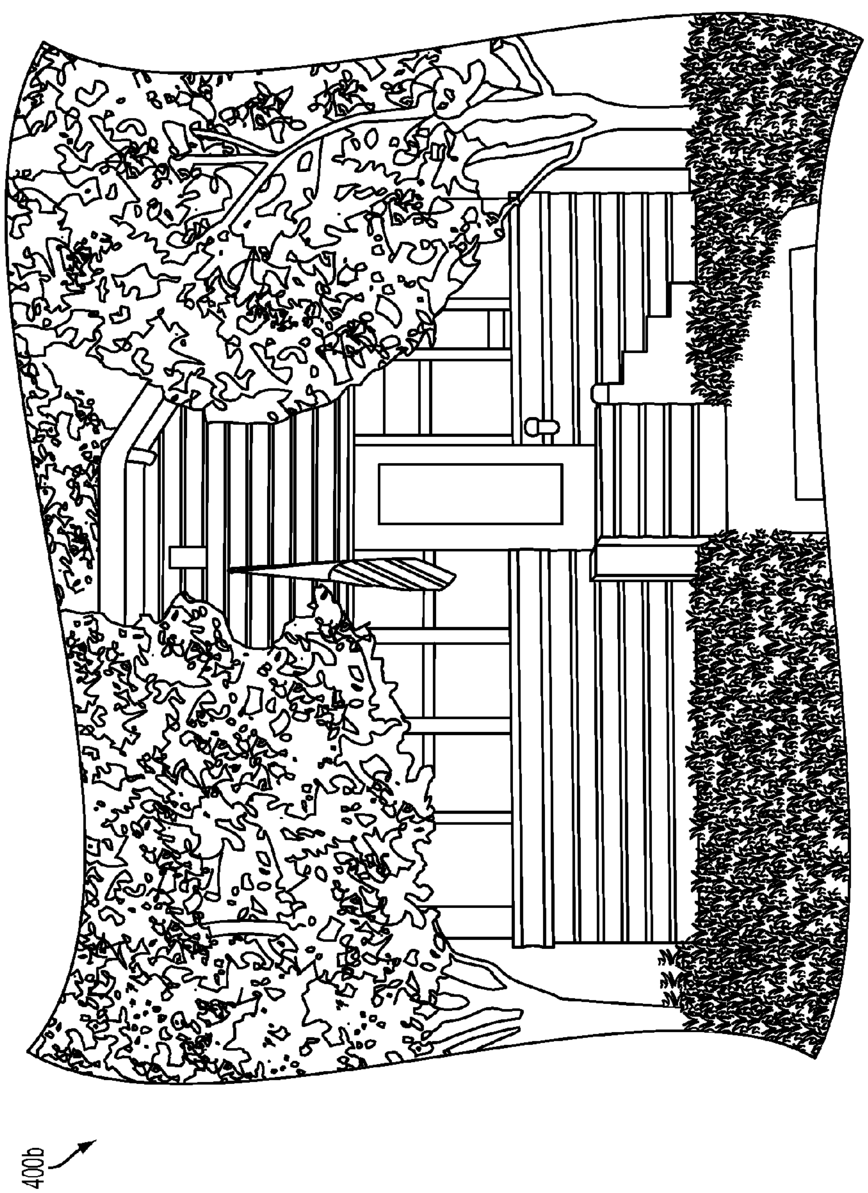

FIGS. 4A-4B, in combination, illustrates an implementation example executed by system 100 of FIG. 1 for enabling a process for capturing an image at two different points in time, in accordance with embodiments of the present invention. The process illustrated in FIGS. 4A-4B retrieves video data from traffic cameras and geo-tagged image data from a smart phone thereby illustrating visual conditions the location within a specified geographical area. The visual conditions and ranked on a scale of 1-10 with a score of 1 being a most desirable condition and a score of 10 being a least desirable condition. System captures images 400*a* and 400*b* at two different points in time. Image 400*a* is captured on May 14, 2013 and image 400*b* is captured on May 14, 2014. System 100 analyzes images 400*a* and 400*b* by disaggregating them into various elements (e.g., a house, a window, a lawn, etc.); scoring the elements against known conditions; and combining the scores of the elements through a weighted average resulting in a calculated condition score for image 400*a* Of 6 and a calculated condition score for image 400*b* of 4. Therefore, system 100 may project that for the location illustrated in FIGS. 4A and 4B, the condition score will equal 2 on May 14, 2015 (i.e., using a simple straight-line fit to the scores associated with images 400*a* and 400*b*, extrapolated using an equal time interval).

Figure 5:
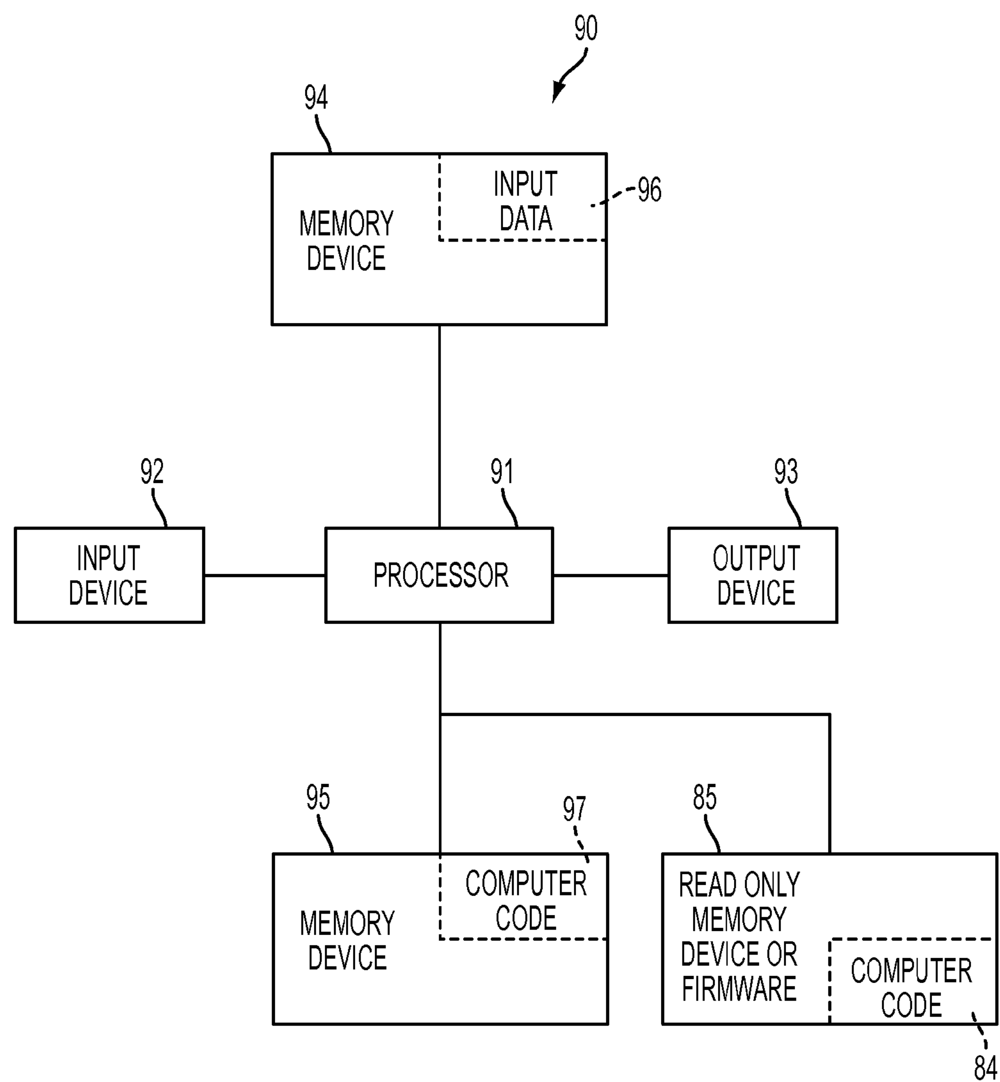
FIG. 5 illustrates a computer system used by or comprised by the system of FIG. 1 for enabling a process for predicting a future overall condition of a geographical area, in accordance with embodiments of the present invention.

FIG. 5 illustrates a computer system 90 (e.g., computing system 14 of FIG. 1) for predicting a future overall condition of a geographical area, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a “circuit,” “module,” or “system.”

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for predicting a future overall condition of a geographical area. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include the algorithms of FIGS. 2 and 3 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithms of FIGS. 2 and 3) may be stored on a static, nonremovable, read-only storage medium such as a Read-Only Memory (ROM) device 85, or may be accessed by processor 103 directly from such a static, nonremovable, read-only medium 85. Similarly, in some embodiments, stored computer program code 84 may be stored as computer-readable firmware 85, or may be accessed by processor 103 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to for predict a future overall condition of a geographical area.

Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for predicting a future overall condition of a geographical area. In another embodiment, the invention provides a business method that performs the process steps of the invention on a subscription, advertising, and/or fee basis. That is, a service supplier, such as a Solution Integrator, could offer to allow users to for predict a future overall condition of a geographical area. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A location condition forecasting virtual simulation and presentation improvement method comprising:

receiving in real time from a user in a specified location, by a computer processor of a computing system, a specified future timeframe associated with a future condition of said specified location;

simultaneously retrieving, by said computer processor from a database, multiple condition data sets associated with at least one element of said specified location, wherein said one element comprises a construction project associated with said specified location;

simultaneously retrieving in realtime, by said computer processor from a plurality of video retrieval apparatuses, a realtime video stream comprising images of differing portions of said specified location;

retrieving in realtime, by said computer processor from a plurality of sensors, sensor readings associated with physical conditions of said specified location, wherein said sensor reading comprise readings indicating heat conditions, light conditions, sound conditions, pressure conditions, magnetism conditions, and motion conditions associated with said specified location;

identifying, by said computer processor based on said realtime video stream and said sensor readings, realtime conditions associated with said construction project;

selecting, by said computer processor, a best fit polynomial equation associated with predicting a future condition of said at least one element;

simultaneously calculating, by said computer processor executing said best fit polynomial equation with respect to said realtime video stream, said sensor readings, said multiple condition data sets, and said specified future timeframe, condition score values associated with future conditions of said at least one element;

calculating, by said computer processor, an overall condition score value associated with said condition score values, wherein said overall condition score value comprises an aggregated weighted average of said condition score values;

presenting, by said computer processor to a user, said overall condition score value;

simulating, by said processor, changes to said construction project based on said condition score values, said realtime video stream, and said sensor readings;

virtually presenting, by said processor to said user, said simulated changes to said construction project; and enabling, by said processor based on said simulating and in response to said virtually presenting, improvements to said construction project.

2. The method of claim 1, wherein said multiple condition data sets comprise current condition data sets associated with current conditions of said at least one element of said specified location.

3. The method of claim 1, wherein said multiple condition data sets comprise current condition data sets associated with current conditions of said at least one element of said specified location and past condition data sets associated with previous conditions of said at least one element of said specified location.

4. The method of claim 1, wherein specified location comprises a specified geographical area, wherein said at least one element is associated with multiple locations within said specified geographical area, and wherein said overall condition score value comprises a single overall condition score value of said specified geographical area.

5. The method of claim 1, wherein specified location comprises a single location within a specified geographical area, and wherein said method further comprises:

simultaneously retrieving, by said computer processor from a database, multiple additional condition data sets associated with additional multiple elements of multiple locations of said specified geographical area;

simultaneously calculating, by said computer processor executing said best fit polynomial equation with respect to said multiple additional condition data sets and said specified future timeframe, additional condition score values associated with future conditions of said additional multiple locations;

calculating, by said computer processor, an overall geographical location condition score value associated with said additional condition score values and said overall condition score value, wherein said overall geographical location condition score value comprises an aggregated weighted average of said additional condition score values and said overall condition score value; and presenting, by said computer processor to said user, said overall geographical location condition score value.

6. The method of claim 1, further comprising:

receiving, by said computer processor from said user, modification data describing anticipated future modifications associated with said at least one element;

selecting, by said computer processor, an updated best fit polynomial equation associated with predicting an updated future condition of said at least one element;

simultaneously calculating, by said computer processor executing said best fit polynomial equation with respect to said modification data, multiple condition data sets, and said specified future timeframe, updated condition score values associated with updated future conditions of said at least one element;

calculating, by said computer processor, an updated overall condition score value associated with said updated condition score values, wherein said updated overall condition score value comprises an aggregated weighted average of said updated condition score values; and presenting, by said computer processor to a user, said updated overall condition score value.

7. The method of claim 1, further comprising:

determining, by said computer processor, a confidence level value associated with said overall condition score value, wherein said confidence level is calculated based on number of said condition score values with respect to a time period elapsed between a current time and said specified future timeframe; and presenting, by said computer processor to said user, said confidence level value.

8. The method of claim 1, further comprising:

providing at least one support service for at least one of creating, integrating, hosting, maintaining, and deploying computer-readable code in the computing system, said code being executed by the computer processor to implement: said receiving, said simultaneously retrieving, said selecting, said simultaneously calculating, said calculating, and said presenting.

9. A computing system comprising a computer processor coupled to a computer-readable memory unit, said memory unit comprising instructions that when executed by the computer processor implements a location condition forecasting virtual simulation and presentation improvement method comprising:

receiving in real time from a user in a specified location, by said computer processor, a specified future timeframe associated with a future condition of said specified location;

simultaneously retrieving, by said computer processor from a database, multiple condition data sets associated with at least one element of said specified location, wherein said one element comprises a construction project associated with said specified location;

simultaneously retrieving in realtime, by said computer processor from a plurality of video retrieval apparatuses, a realtime video stream comprising images of differing portions of said specified location;

retrieving in realtime, by said computer processor from a plurality of sensors, sensor readings associated with physical conditions of said specified location, wherein said sensor reading comprise readings indicating heat conditions, light conditions, sound conditions, pressure conditions, magnetism conditions, and motion conditions associated with said specified location;

identifying, by said computer processor based on said realtime video stream and said sensor readings, realtime conditions associated with said construction project;

selecting, by said computer processor, a best fit polynomial equation associated with predicting a future condition of said at least one element;

simultaneously calculating, by said computer processor executing said best fit polynomial equation with respect to said realtime video stream, said sensor readings, said multiple condition data sets, and said specified future timeframe, condition score values associated with future conditions of said at least one element;

calculating, by said computer processor, an overall condition score value associated with said condition score values, wherein said overall condition score value comprises an aggregated weighted average of said condition score values;

presenting, by said computer processor to a user, said overall condition score value;

simulating, by said processor, changes to said construction project based on said condition score values, said realtime video stream, and said sensor readings;

virtually presenting, by said processor to said user, said simulated changes to said construction project; and enabling, by said processor based on said simulating and in response to said virtually presenting, improvements to said construction project.

10. The computing system of claim 9, wherein said multiple condition data sets comprise current condition data sets associated with current conditions of said at least one element of said specified location.

11. The computing system of claim 9, wherein said multiple condition data sets comprise current condition data sets associated with current conditions of said at least one element of said specified location and past condition data sets associated with previous conditions of said at least one element of said specified location.

12. The computing system of claim 9, wherein specified location comprises a specified geographical area, wherein said at least one element is associated with multiple locations within said specified geographical area, and wherein said overall condition score value comprises a single overall condition score value of said specified geographical area.

13. The computing system of claim 9, wherein specified location comprises a single location within a specified geographical area, and wherein said method further comprises:

simultaneously retrieving, by said computer processor from a database, multiple additional condition data sets associated with additional multiple elements of multiple locations of said specified geographical area;

simultaneously calculating, by said computer processor executing said best fit polynomial equation with respect to said multiple additional condition data sets and said specified future timeframe, additional condition score values associated with future conditions of said additional multiple locations;

calculating, by said computer processor, an overall geographical location condition score value associated with said additional condition score values and said overall condition score value, wherein said overall geographical location condition score value comprises an aggregated weighted average of said additional condition score values and said overall condition score value; and presenting, by said computer processor to said user, said overall geographical location condition score value.

14. The computing system of claim 9, wherein said method further comprises:

receiving, by said computer processor from said user, modification data describing anticipated future modifications associated with said at least one element;

selecting, by said computer processor, an updated best fit polynomial equation associated with predicting an updated future condition of said at least one element;

simultaneously calculating, by said computer processor executing said best fit polynomial equation with respect to said modification data, multiple condition data sets, and said specified future timeframe, updated condition score values associated with updated future conditions of said at least one element;

calculating, by said computer processor, an updated overall condition score value associated with said updated condition score values, wherein said updated overall condition score value comprises an aggregated weighted average of said updated condition score values; and presenting, by said computer processor to a user, said updated overall condition score value.

15. The computing system of claim 9, wherein said method further comprises:

determining, by said computer processor, a confidence level value associated with said overall condition score value, wherein said confidence level is calculated based on number of said condition score values with respect to a time period elapsed between a current time and said specified future timeframe; and presenting, by said computer processor to said user, said confidence level value.

16. A computer program product, comprising a computer readable hardware storage device storing a computer readable program code, said computer readable program code comprising an algorithm that when executed by a computer processor of a computing system implements a location condition forecasting virtual simulation and presentation improvement method, said method comprising:

receiving in real time from a user in a specified location, by said computer processor, a specified future timeframe associated with a future condition of said specified location;

simultaneously retrieving, by said computer processor from a database, multiple condition data sets associated with at least one element of said specified location, wherein said one element comprises a construction project associated with said specified location;

simultaneously retrieving in realtime, by said computer processor from a plurality of video retrieval apparatuses, a realtime video stream comprising images of differing portions of said specified location;

retrieving in realtime, by said computer processor from a plurality of sensors, sensor readings associated with physical conditions of said specified location, wherein said sensor reading comprise readings indicating heat conditions, light conditions, sound conditions, pressure conditions, magnetism conditions, and motion conditions associated with said specified location;

identifying, by said computer processor based on said realtime video stream and said sensor readings, realtime conditions associated with said construction project selecting, by said computer processor, a best fit polynomial equation associated with predicting a future condition of said at least one element;

simultaneously calculating, by said computer processor executing said best fit polynomial equation with respect to said realtime video stream, said sensor readings, said multiple condition data sets, and said specified future timeframe, condition score values associated with future conditions of said at least one element;

calculating, by said computer processor, an overall condition score value associated with said condition score values, wherein said overall condition score value comprises an aggregated weighted average of said condition score values;

presenting, by said computer processor to a user, said overall condition score value;

simulating, by said processor, changes to said construction project based on said condition score values, said realtime video stream, and said sensor readings;

virtually presenting, by said processor to said user, said simulated changes to said construction project; and enabling, by said processor based on said simulating and in response to said virtually presenting, improvements to said construction project.

17. The computer program product of claim 16, wherein said multiple condition data sets comprise current condition data sets associated with current conditions of said at least one element of said specified location.

18. The computer program product of claim 16, wherein said multiple condition data sets comprise current condition data sets associated with current conditions of said at least one element of said specified location and past condition data sets associated with previous conditions of said at least one element of said specified location.

19. The computer program product of claim 16, wherein specified location comprises a specified geographical area, wherein said at least one element is associated with multiple locations within said specified geographical area, and wherein said overall condition score value comprises a single overall condition score value of said specified geographical area.

20. The computer program product of claim 16, wherein specified location comprises a single location within a specified geographical area, and wherein said method further comprises:

simultaneously retrieving, by said computer processor from a database, multiple additional condition data sets associated with additional multiple elements of multiple locations of said specified geographical area;

simultaneously calculating, by said computer processor executing said best fit polynomial equation with respect to said multiple additional condition data sets and said specified future timeframe, additional condition score values associated with future conditions of said additional multiple locations;

calculating, by said computer processor, an overall geographical location condition score value associated with said additional condition score values and said overall condition score value, wherein said overall geographical location condition score value comprises an aggregated weighted average of said additional condition score values and said overall condition score value; and presenting, by said computer processor to said user, said overall geographical location condition score value.

* * * * *